United States Patent
Kurihara

(10) Patent No.: US 7,887,452 B2
(45) Date of Patent: Feb. 15, 2011

(54) CONTINUOUSLY VARIABLE TRANSMISSION

(75) Inventor: Toshiro Kurihara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 286 days.

(21) Appl. No.: 12/147,747

(22) Filed: Jun. 27, 2008

(65) Prior Publication Data

US 2009/0017958 A1 Jan. 15, 2009

(30) Foreign Application Priority Data

Jun. 29, 2007 (JP) .............................. 2007-173082

(51) Int. Cl.
*F16H 37/02* (2006.01)
(52) U.S. Cl. .................................................. 475/211
(58) Field of Classification Search ................. 475/210, 475/211
See application file for complete search history.

(56) References Cited

U.S. PATENT DOCUMENTS

| | | | | |
|---|---|---|---|---|
| 2,738,688 A * | 3/1956 | Shaw | ........................ | 475/211 |
| 2,760,386 A * | 8/1956 | Southwick | ................... | 474/30 |
| 2,831,358 A * | 4/1958 | Michie | ........................ | 474/35 |
| 2,927,470 A * | 3/1960 | Heyer | .......................... | 474/35 |
| 2,932,216 A * | 4/1960 | Schou | ......................... | 475/143 |
| 3,670,594 A * | 6/1972 | Roper | ......................... | 475/211 |
| 4,056,987 A * | 11/1977 | Hoffmann | ..................... | 474/23 |
| 4,136,581 A * | 1/1979 | Winter et al. | ............... | 475/210 |
| 6,398,679 B1 * | 6/2002 | Brown | ......................... | 474/35 |

FOREIGN PATENT DOCUMENTS

| | | |
|---|---|---|
| JP | 52-79172 | 7/1977 |
| JP | 63-009770 | 1/1988 |

* cited by examiner

*Primary Examiner*—Dirk Wright
(74) *Attorney, Agent, or Firm*—Smith, Gambrell & Russell, LLP

(57) ABSTRACT

Two input-shaft-side fixed sheaves of respective first and second pulley-type continuously variable transmission mechanisms are integrally connected and secured to each other while their back sides abut against each other. One of output-shaft-side movable sheaves and the other of output-shaft-side fixed sheaves are provided between one of the output-shaft-side fixed sheaves and the other of the output-shaft-side movable sheaves while their back sides abut against each other, so as to be rotatable relative to each other and so as to be movable together on a sun-gear input shaft. The one of the output-shaft-side movable sheaves is formed consecutively with an input shaft of a planetary carrier of a planetary gear mechanism. The other of the output-shaft-side fixed pulleys is formed consecutively with an input shaft of a sun gear of the planetary gear mechanism.

2 Claims, 3 Drawing Sheets

CONTINUOUSLY VARIABLE TRANSMISSION

CROSS REFERENCES TO RELATED APPLICATIONS

The disclosure of Japanese Patent Application No. 2007-173082 filed on Jun. 29, 2007 including the specification, drawings and abstract is incorporated herein by reference in its entirety.

BACKGROUND OF THE INVENTION

1. Field of the Invention

The present invention relates to a continuously variable transmission. More particularly, the present invention relates to a continuously variable transmission including two pulley-type continuously variable transmission mechanisms and a planetary gear mechanism that combines two input components to output them as one output component.

2. Description of the Related Art

Hitherto, one such known type of continuously variable transmission includes two pulley-type continuously variable transmission mechanisms (variators) disposed in parallel between an input shaft and an output shaft. The two variators each include a belt or a chain and an input-shaft side pulley and an output-shaft side pulley. The pulleys clamp the corresponding belt or chain. Two output components output from the respective variators are input to a planetary gear mechanism, and are combined, so that they are output as one output component. (Refer to, for example, Japanese Unexamined Patent Application Publication Nos. 52-79172 and 63-9770.)

However, in each of the above-described related continuously variable transmission, pulley moving devices (for example, a hydraulic chamber, a hydraulic cylinder, or a driving motor) are provided at the back portions of four movable pulleys for controlling a speed-change ratio by changing the widths of the pulleys. Therefore, the input shaft and the output shaft become long, thereby increasing the size of the continuously variable transmission. Consequently, installation to a vehicle becomes difficult.

In addition, each of the above-described related continuously variable transmission is formed so that two output components output from the two variators are input to a ring gear and a sun gear of the planetary gear mechanism, respectively, to output them as one output component from a planetary carrier. Therefore, although there is difference between the speed of the sun gear and the speed of the ring gear, the directions of rotation are the same. Consequently, the planetary carrier rotates forwardly in accordance with the direction of rotation, but cannot rotate in the reverse direction or perform neutral rotation. Thus, a forward-backward movement switching device and a switching clutch are required.

SUMMARY OF THE INVENTION

Accordingly, the present invention is achieved to overcome the problems of the related art, and has as its object the provision of a small continuously variable transmission that can cover a very wide range from low speed to high speed in reverse rotation, neutral rotation, and forward rotation without using a forward-backward movement switching device and a switching clutch.

To this end, according to a first aspect of the present invention, there is provided a continuously variable transmission including two pulley-type continuously variable transmission mechanisms and a planetary gear mechanism. Each pulley-type continuously variable transmission mechanism presses a belt or a chain from the left and right by clamping sides of the belt or the chain with a corresponding movable sheave of an input-shaft-side pulley, a corresponding fixed sheave of the input-shaft-side pulley, a corresponding movable sheave of an output-shaft-side pulley, and a corresponding fixed sheave of the output-shaft-side pulley, and by moving the movable sheave by a corresponding pulley moving device, so that power is transmitted by friction force thereof. The corresponding pulley moving device is provided at a back side of the movable sheave. The planetary gear mechanism receives and combines two output components from the two pulley-type continuously variable transmission mechanisms, and outputs the combined output components as one output component. The two input-shaft-side fixed sheaves are integrally connected and secured to each other while back sides of the two input-shaft-side fixed sheaves abut against each other.

According to the first aspect, two input-shaft-side fixed sheaves are integrally joined and secured to each other while their back sides abut against each other. Therefore, even if pulley moving devices are provided at the back sides of the two input-shaft-side movable sheaves, respectively, the overall length of the input shaft can be made shorter than that in a related art. Consequently, the continuously variable transmission can be reduced in size.

In a first form of the present invention, one of the output-shaft-side movable sheaves and the other of the output-shaft-side fixed sheaves are provided between one of the output-shaft-side fixed sheaves and the other of the output-shaft-side movable sheaves while the back sides of the one of the output-shaft-side movable sheaves and the other of the output-shaft-side fixed sheaves abut against each other, so as to be rotatable relative to each other and so as to be movable together along an input shaft of a sun gear or along an input shaft of a planetary carrier. The one of the output-shaft-side movable sheaves is consecutively provided with an input shaft of a ring gear or the input shaft of the planetary carrier of the planetary gear mechanism. The other of the output-shaft-side fixed sheaves is provided consecutively with the input shaft of the planetary carrier or the input shaft of the sun gear of the planetary gear mechanism.

According to the first form of the present invention, the pulley moving device provided at the back side of the other output-shaft-side movable sheave changes the widths of the two sets of pulleys provided at the output-shaft side. Accordingly, in addition to providing the operational advantages provided by the first aspect, the first form provides the following advantages. That is, the continuously variable transmission can be further reduced in size because the longitudinal direction (axial direction) size at the output-shaft side becomes smaller than that in a related art. In addition, at the output-shaft side, the number of pulley moving devices for moving the movable sheaves can be one fewer than the number of pulley moving devices used in a related art. Therefore, the structure of the continuously variable transmission can be further simplified, and costs can be reduced.

Further, the continuously variable transmission has an infinite speed-change ratio width. Therefore, using a range in which the fuel consumption of the engine is the best, it is possible for the continuously variable transmission to accelerate to a maximum speed from the starting thereof without using a clutch. In addition, it can cover a very wide range from low speed to high speed in reverse rotation, neutral rotation, and forward rotation without using a forward-backward movement switching device and a switching clutch.

In a second form of the present invention, the continuously variable transmission further includes a pressure control hydraulic mechanism that controls a speed change by controlling a hydraulic balance for moving the two input-shaft-side movable sheaves, and that sets tension of the belt or the chain on the basis of a pressure absolute value for moving the two input-shaft-side movable sheaves and the other of the output-shaft-side movable sheaves.

According to the second form of the present invention, the pressure control hydraulic mechanism controls speed change by controlling a hydraulic balance for moving the two input-shaft-side movable sheaves, and sets the tension of the belt or the chain on the basis of a pressure absolute value for moving the two input-shaft-side movable sheaves and the other of the output-shaft-side movable sheaves. Therefore, in addition to providing the operational advantages of the first form, the second form provides the following advantages. That is, the speeds of the first and second pulley-type continuously variable transmission mechanisms are varied at the same time to double a speed-change responsiveness. In addition, at the same total gear ratio, one of the variator speed-change ratio widths can be made small, so that a speed-change range in which the belt or the chain has good transmission efficiency and durability can be used.

According to a second aspect of the present invention, there is provided a continuously variable transmission including two pulley-type continuously variable transmission mechanisms and a planetary gear mechanism. Each pulley-type continuously variable transmission mechanism presses a belt or a chain from the left and right by clamping sides of the belt or the chain with a corresponding movable sheave of an input-shaft-side pulley, a corresponding fixed sheave of the input-shaft-side pulley, a corresponding movable sheave of an output-shaft-side pulley, and a corresponding fixed sheave of the output-shaft-side pulley, and by moving the movable sheave by a corresponding pulley moving device, so that power is transmitted by friction force thereof. The corresponding pulley moving device is provided at a back side of the movable sheave. The planetary gear mechanism inputs an output of one of the two pulley-type continuously variable transmission mechanisms to a sun gear, and an output of the other of the two pulley-type continuously variable transmission mechanisms to a planetary carrier, and outputs the outputs as one output component from a ring gear. The planetary carrier supports a pinion gear engaging the sun gear. The ring gear engages the pinion gear and the sun gear.

According to the second aspect, two output components output from the two pulley-type continuously variable transmission mechanisms are input, respectively, to the sun gear and the planetary carrier, supporting the pinion gear, of the planetary gear mechanism, so that they are output as one output component from the ring gear. Accordingly, it is possible to reverse the direction of rotation of the ring gear or stop the rotation of the ring gear in accordance with the difference between the speed of the sun gear and the speed of the planetary carrier. Therefore, the continuously variable transmission has an infinite speed-change width. Therefore, using a range in which the fuel consumption of the engine is the best, it is possible for the continuously variable transmission to accelerate to a maximum speed from the starting thereof without using a clutch. In addition, it can cover a very wide range from low speed to high speed in reverse rotation, neutral rotation, and forward rotation without using a forward-backward movement switching device and a switching clutch.

The continuously variable transmission of the present invention can cover a very wide range from low speed to high speed in reverse rotation, neutral rotation, and forward rotation. Therefore, the continuously variable transmission can be used in a wide range of fields, not only in a transmission in transportation facilities, but also in agricultural machine tools, industrial machine tools, aircraft power transmission devices, and marine power transmission devices.

DESCRIPTION OF THE PREFERRED EMBODIMENTS

A continuously variable transmission according to an embodiment of the present invention will be described in detail with reference to the drawings.

Figure 1:
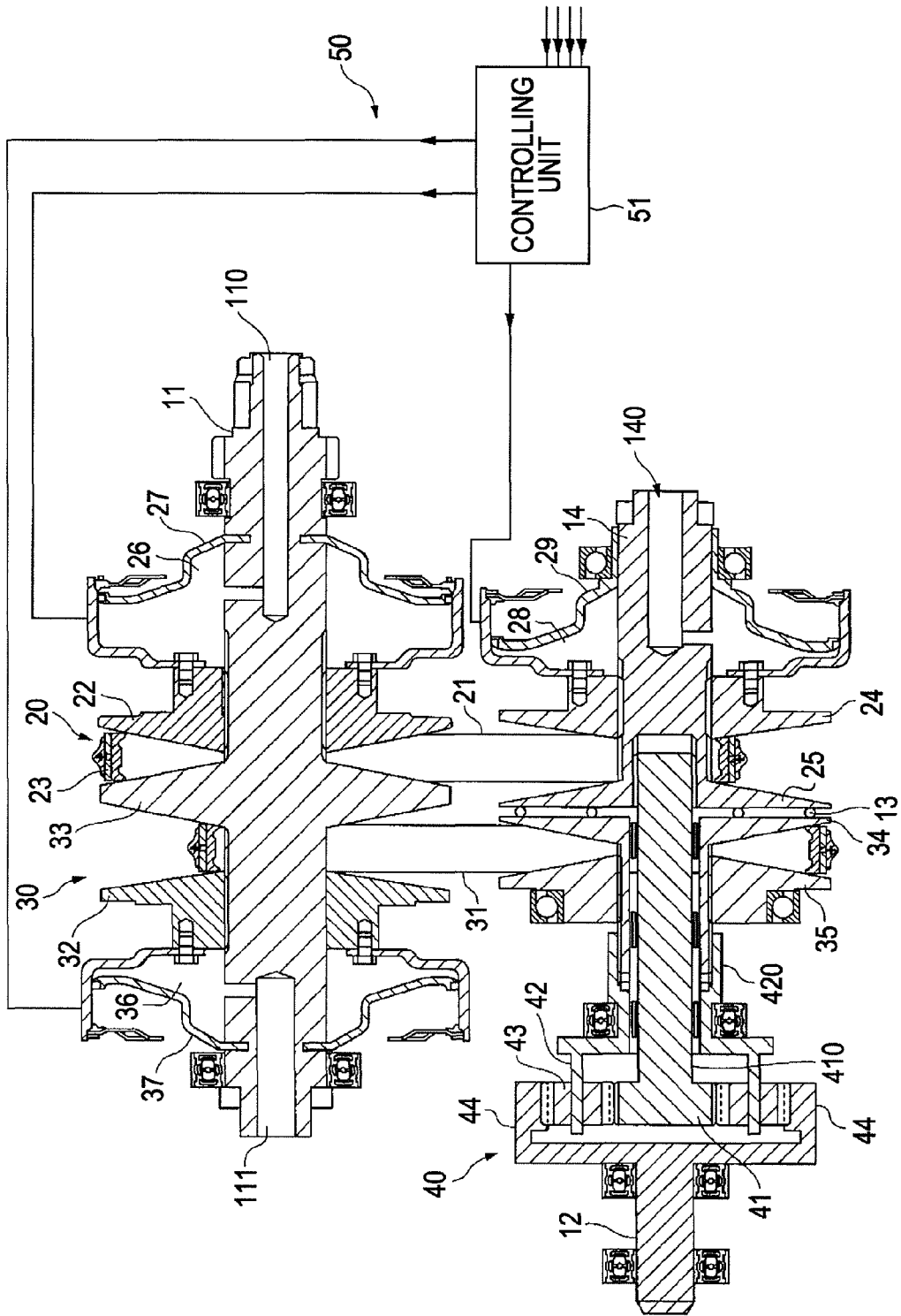
FIG. 1 is a schematic view of the structure of a continuously variable transmission according to an embodiment of the present invention.
Figure 2:
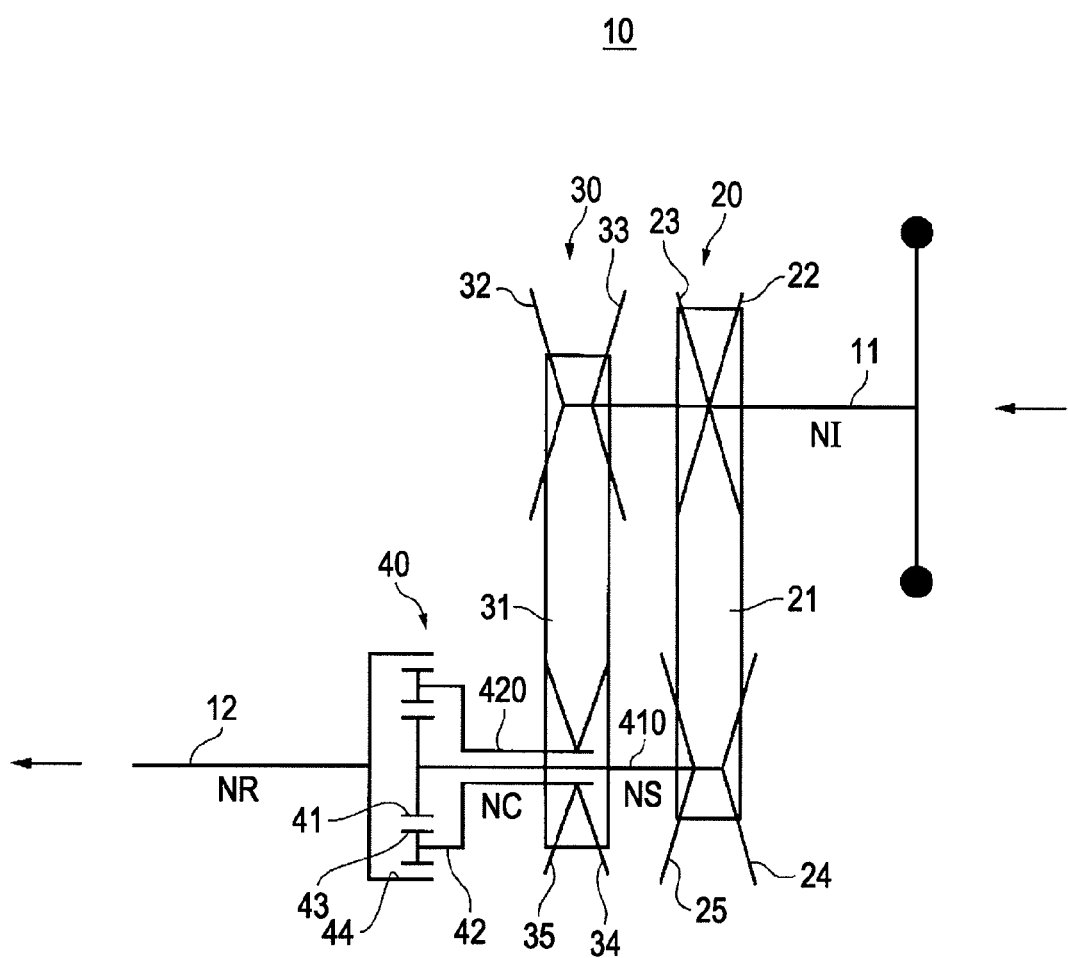
FIG. 2 shows a skeleton of FIG. 1.
Figure 3:
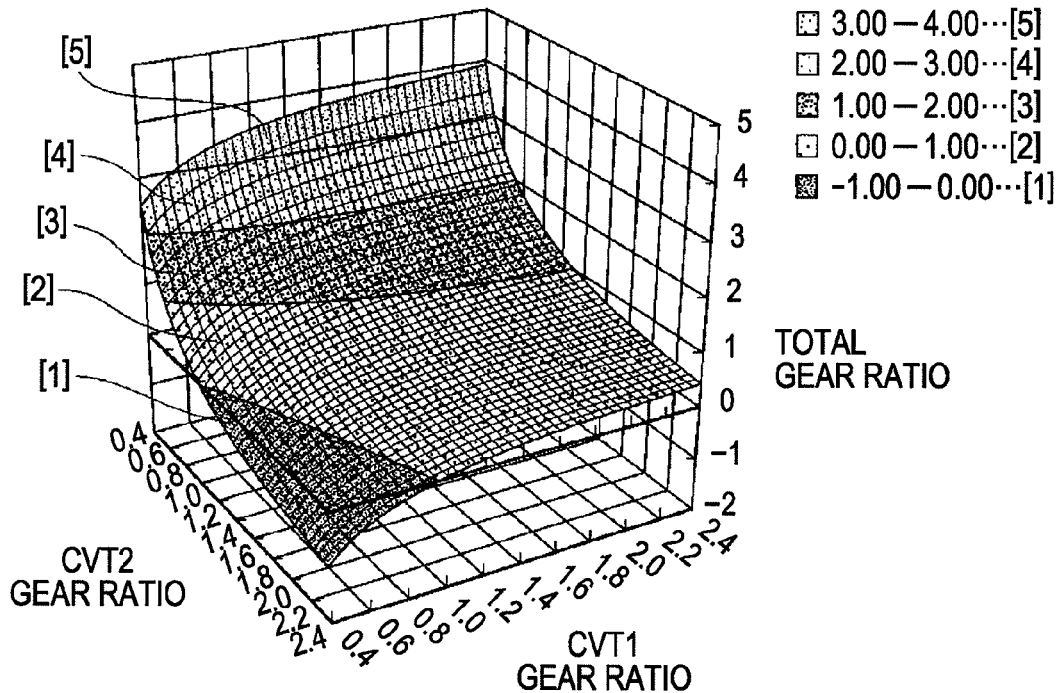
FIG. 3 shows a speed-change map data of the continuously variable transmission.
Figure 4:
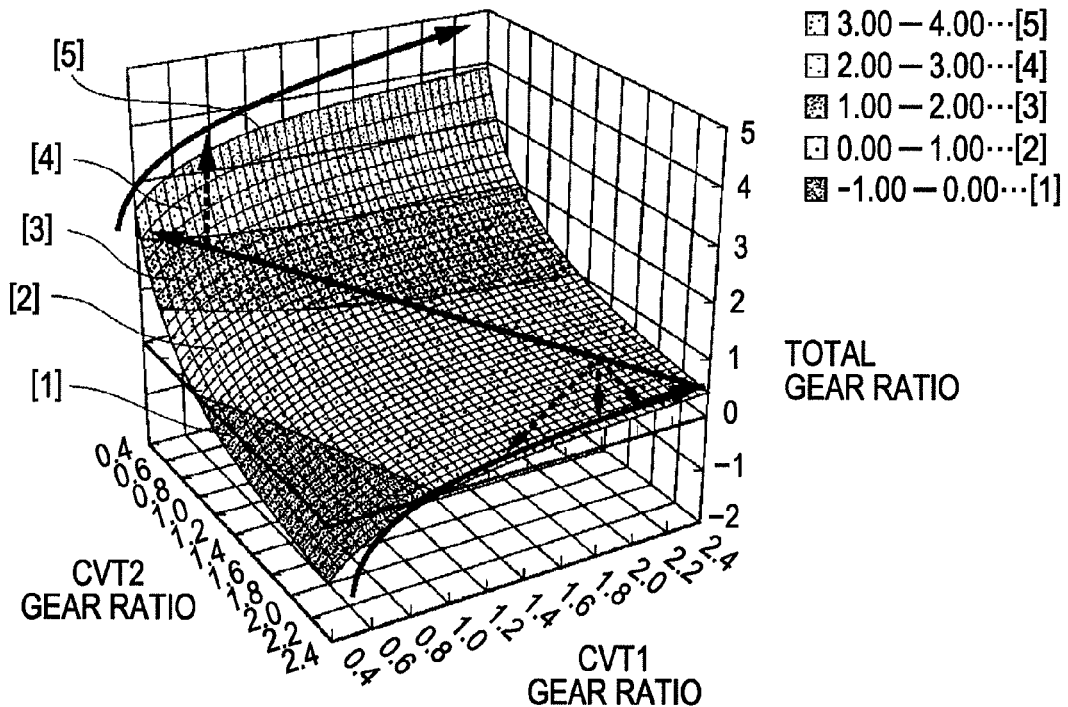
FIG. 4 illustrates an example of a speed-change control using the speed-change map data shown in FIG. 3.

FIG. 1 is a schematic view of the structure of a continuously variable transmission according to an embodiment of the present invention. FIG. 2 shows a skeleton of FIG. 1. FIG. 3 shows a speed-change map data of the continuously variable transmission. FIG. 4 illustrates an example of a speed-change control using the speed-change map data shown in FIG. 3.

As shown in FIG. 1, a continuously variable transmission 10 (hereinafter referred to as "CVT 10") includes an input shaft 11, an output shaft 12, a first pulley-type continuously variable transmission mechanism 20 (hereinafter referred to as "first variator 20"), a second pulley-type continuously variable transmission mechanism 30 (hereinafter referred to as "second variator 20"), a planetary gear mechanism 40, and a pressure control hydraulic mechanism 50.

More specifically, the input shaft 11 is a power transmission shaft that inputs a driving force (rotational force, torque), output from an engine output shaft (crank shaft) (not shown), to the CVT 10. The first variator 20, the second variator 30, and the planetary gear mechanism 40 are disposed between the input shaft 11 and the output shaft 12. The variators 20 and 30 are disposed parallel to each other so that the speed of the driving force, transmitted from the input shaft 11, is changed in a stepless manner. The planetary gear mechanism 40 receives and combines two output components, output from the first variator 20 and the second variator 30, so that the two output components are transmitted to the output shaft 12 as one output component.

The first variator 20 presses a belt (or a chain) 21 from the left and right as a result of clamping sides of the belt with a movable sheave 22 of an input-shaft-side pulley, a fixed sheave 23 of the input-shaft-side pulley, a movable sheave 24 of an output-shaft-side pulley, and a fixed sheave 25 of the output-shaft-side pulley; and transmits power using friction force thereof.

Similarly to the first variator 20, the second variator 30 presses of a belt (or a chain) 31 from the left and right as a result of clamping sides of the belt with an input-shaft-side pulley, a fixed sheave 33 of the input-shaft-side pulley, a movable sheave 34 of an output-shaft-side pulley, and a fixed sheave 35 of the output-shaft-side pulley; and transmits power using friction force thereof.

The input-shaft-side fixed sheaves 23 and 33 of the respective first variator 20 and second variator 30 are secured to the input shaft 11 so as not to be dislodged, while their back sides abut against each other (for example, while they are mechanically or metallurgically connected to each other or are integrally combined and secured to each other by integrally forming them).

The movable sheave 22 is fitted to the input shaft 11 using a ball spline. A hydraulic chamber 26, a hydraulic cylinder 27, a hydraulic circuit (not shown), and a hydraulic control valve (not shown) are provided at the back of the movable sheave 22 as pulley moving devices under control of a controlling unit 51. The movable sheave 22 moves on the input shaft 11 on the basis of a control signal of the controlling unit 51.

Similarly, the movable sheave 32 is fitted to the input shaft 11 using a ball spline. A hydraulic chamber 36, a hydraulic cylinder 37, a hydraulic circuit (not shown), and a hydraulic control valve (not shown) are provided at the back of the movable sheave 32 as pulley moving devices under the control of the controlling unit 51. The movable sheave 32 moves on the input shaft 11 on the basis of a control signal of the controlling unit 51.

Oil paths 110 and 111 are provided in the inner portion of the input shaft 11. The oil paths 110 and 111 are used to provide hydraulic pressure to and remove it from the hydraulic chambers 26 and 36. The hydraulic pressure is used to move the movable sheaves 22 and 32 along the input shaft 11.

Accordingly, since the two input-shaft-side fixed sheaves 23 and 33 are integrally joined and secured to each other while their back sides abut against each other, even if the pulley moving devices are provided at the back of the two input-shaft-side movable sheaves 22 and 32, the overall length of the input shaft 11 becomes shorter than that in a related art. Therefore, the size of the CVT 10 can be reduced.

The first output-shaft-side fixed sheave 25 and the second output-shaft-side movable sheave 34 are integrally connected to each other between the first output-shaft-side movable sheaves 24 and the second output-shaft-side fixed sheave 35 through a thrust bearing 13 so that they can rotate relative to each other, while their back sides abut against each other. The first output-shaft-side fixed sheave 25 is movably provided consecutively with a sun gear input shaft 410 of the planetary gear mechanism 40 by ball-spine fitting. The second output-shaft-side movable sheave 34 is consecutively provided with the inner periphery of a planetary carrier input shaft 420 of the planetary gear mechanism 40 by ball spline fitting so as to be movable and rotatable relatively on a sun gear input shaft 410.

That is, the first output-shaft-side fixed sheave 25 and the second output-shaft-side movable sheave 34, which are integrated to each other, are provided so as to be movable on the sun gear input shaft 41. The output component of the first variator 20 is input to the sun gear 410 of the planetary gear mechanism 40, and the output component of the second variator 30 is input to the planetary carrier 42 of the planetary gear mechanism 40.

The first output-shaft-side movable sheave 24 is fitted to a rotary shaft 14 (coaxial with the output shaft 12) using a ball spline. In addition, a hydraulic chamber 28, a hydraulic cylinder 29, a hydraulic circuit (not shown), and a hydraulic control valve (not shown) are provided at the back of the first output-shaft-side movable sheave 24 as pulley moving devices under the control of the controlling unit 51. An oil path 140 is provided in the inner portion of the rotary shaft 14. The oil path 140 is used to provide hydraulic pressure to and remove it from the hydraulic chamber 28. The hydraulic pressure is used to move the movable pulley 24 along the rotary shaft 14.

Accordingly, moving the movable sheave 24 on the rotary shaft 14 on the basis of a control signal of the controlling unit 51 makes it possible to change pulley groove widths of the output-shaft-side movable sheave 24 and fixed sheave 25 and pulley groove widths of the movable sheave 34 and the fixed sheave 35. The sizes in longitudinal direction (output-shaft sides) of the output shaft 12 to the rotary shaft 14 is shortened, and the input shaft 11 is shortened, so that the size of the CVT 10 is reduced.

The planetary gear mechanism 40 is a single planetary type. An output component output from the first variator 20 is input to the sun gear 41. An output component output from the second variator 30 is input to the planetary carrier 42 supporting a pinion gear 43 engaging the sun gear 41. A ring gear 44 that engages the pinion gear 43 outputs the output components. The output shaft 12, which is coaxial sun gear input shaft 410, is connected to the sun gear 41. The planetary carrier input shaft 420 relatively rotatably supported by the sun gear input shaft 410 is connected to the planetary carrier 42. The output shaft 12 is connected to the ring gear 44.

The planetary gear mechanism 40 is not limited to a single planetary type. It may also be a double planetary type.

The pressure control hydraulic mechanism 50 includes the controlling unit 51 and each of the pulley moving devices (the hydraulic chambers 26, 28, and 36, the hydraulic cylinders 27, 29, and 37, the hydraulic circuits, and the hydraulic control valves). The type of pulley moving devices is not limited to a hydraulic type. It may be, for example, an electric type using a driving motor.

The controlling unit 51 includes a microprocessor and various input/output ports. By executing various application programs formed into firmware using ROM, operating pressures of the two input-shaft-side movable sheaves 22 and 32 and operating pressure of the output-shaft-side movable sheave 24 are changed on the basis of various map data (an example is illustrated in FIG. 3), and engine load (opening angle of an accelerator), the number of rotations of the engine, and a speed-change ratio (vehicle speed), detected by various on-vehicle sensors. When the operating pressures are changed, the pulley groove widths of the first and second variators 20 and 30 are controlled. The controlling of the speed change is carried out by controlling hydraulic balance for moving the two input-shaft-side movable pulleys 22 and 32. The tension of the belts 21 and 31 is set on the basis of a pressure absolute value for moving the two input-shaft-side movable pulleys 22 and 32 and the output-shaft-side movable pulley 24.

Here, the method of determining the map data shown in FIG. 3 will be described.

As shown in FIG. 2, driving power transmitted from the input shaft 11 is divided by the input pulleys (that is, the movable sheave 22 and the fixed sheave 23) of the first variator 20 and by the input pulleys (that is, movable pulley 32 and the fixed pulley 33) of the second variator 30. The divided driving power is transmitted to the output pulleys (that is, the movable sheave 24 and the fixed sheave 25) of the variator 20 and the output pulleys (that is, the movable sheave 34 and the fixed sheave 35) of the variator 30 through the belt 21 of the variator 20 and the belt 31 of the variator 30. When this state is defined so that the number of rotations of the input pulleys of the variator 20 and the number of rotations of the input pulleys of the variator 30 is N1, the number of rotations of the output pulleys of the variator 20 is N2, the number of rotations of the output pulleys of the variator 30 is NC, the speed-change ratio of the variator 20 is R1, and the speed-change ratio of the variator 30 is R2, the following Formulas (1) and (2) are established:

$$NS = N1/R1 \quad (1)$$

$$NC = N1/R2 \quad (2)$$

The output components of the output pulleys of the variator 20 are input to the sun gear 41 of the planetary gear mechanism 40, and the output components of the output pulleys of the variator 30 are input to the planetary carrier 42. These output components are combined and output to the ring gear 44 as one output component.

When this state is defined so that the number of teeth of the sun gear 41 is ZS, the number of teeth of the ring gear 44 is ZR, and the number of rotations of the ring gear 44 is NR, the following Formula (3) is established:

$$ZS*NS+ZR*NR=(ZS+ZR)*NC \quad (3)$$

Therefore, Formula (4) is established:

$$NR=\{(ZS+ZR)/RS-ZS/R1\}/ZR*NI \quad (4)$$

Here, when ZR/ZS=R3, the following Formula (5) is established:

$$NR=\{(1+1/R3)/R2-1/R3/R1\}*NI \quad (5)$$

From Formula (5), the gear ratio of the number NR of output rotations with respect to the number NI of input rotations is determined by the following Formula (6):

$$NR/NI=(1+1/R3)-1/R3/R1 \quad (6)$$

When R1 and R2 are variables, and R3 is a constant value (for example, 72/48=1.5), the map data shown in FIG. 3 is obtained.

The method of obtaining the map data shown in FIG. 3 has been described.

When the speed-change ratios of the first and second variators 20 and 30 can be achieved by the same speed-change ratio, the controlling unit 51 controls the speed-change ratios of the variators 20 and 30 so that the speed-change ratios are equal to each other. When the speed-change ratio of one of the variators reaches an upper limit or a lower limit, the speed of only the other variator is changed as indicated by the solid arrow shown in FIG. 4.

Further, when the speed-change ratios of the variators 20 and 30 have target speed-change ratios that cannot be achieved by the same speed-change ratio, one of the variators has its speed-change speed reduced, is stopped, or its speed-change direction is reversed as indicated by the dotted line shown in FIG. 4.

This causes the CVT 10 to have an infinite speed-change width. Therefore, using a range in which the fuel consumption of the engine is the best, the CVT 10 can accelerate to a maximum speed from the starting thereof without using a clutch. In addition, without using a forward-backward movement switching device and a switching device, the CVT 10 can cover a very wide range from low speed to high speed (at the speed-increase side, the speed can be quadrupled with respect to an input) in reverse rotation (the reverse gear ratio can be extended to about 1:1), neutral rotation, and forward rotation without using a forward-backward movement switching device and a switching clutch. Moreover, since the speed is continuously changed, there is no speed-change shock.

By simultaneously changing the speeds of the variators 20 and 30, the speed-change responsiveness can be doubled, and the speed-change-ratio width of one of the variators can be set small at the same total gear ratio. Therefore, a speed-change range in which transmission efficiency and durability of the belts 21 and 31 are good can be used.

Further, by installing the CVT 10 to a hybrid vehicle, it is possible to increase efficiency when performing regeneration braking at a low vehicle speed.

As mentioned above, according to the CVT, two input-shaft-side fixed sheaves 23 and 33 are integrally joined and secured to each other while their back sides abut against each other. Therefore, even if pulley moving devices are provided at the back sides of the two input-shaft-side movable sheaves 22 and 32, respectively, the overall length of the input shaft 11 can be made shorter than that in a related art. Consequently, the CVT 10 can be reduced in size.

According to the present invention, the pulley moving devices provided at the back of the output-shaft-side movable sheave 24 of the first pulley-type continuously variable transmission mechanism 20 change the pulley widths of the output-shaft-side sheaves 24, 25, 34, and 35. This makes it possible to shorten the size in the longitudinal direction (axial direction) than that in a related art. Therefore, the size of the CVT 10 can be reduced. Further, at the output-shaft side, the number of pulley movable devices for moving the movable sheaves can be one fewer than the number of pulley movable devices in a related art. Therefore, the structure of the CVT 10 can be simplified, and costs can be reduced. Still further, the continuously variable transmission has an infinite speed-change width. Therefore, using a range in which the fuel consumption of the engine is the best, it is possible for the CVT to accelerate to a maximum speed from the starting thereof without using a clutch. In addition, it can cover a very wide range from low speed to high speed in reverse rotation, neutral rotation, and forward rotation without using a forward-backward movement switching device and a switching clutch.

According to the present invention, the pressure control hydraulic mechanism 50 controls speed change by controlling a hydraulic balance for moving the two input-shaft-side movable sheaves, and sets the tension of the belt or the chain on the basis of a pressure absolute value for moving the two input-shaft-side movable sheaves and the other output-shaft-side movable sheave. Therefore, the speeds of the first and second variators 20 and 30 are varied at the same time to double a speed-change responsiveness. In addition, at the same total gear ratio, one of the variator speed-change ratio widths can be made small, so that a speed-change range in which the belts 21 and 31 have good transmission efficiency and durability can be used.

According to the present invention, two output components output from the first and second variators 20 and 30 are input, respectively, to the sun gear 41 and the planetary carrier 42, supporting the pinion gear 43, of the planetary gear mechanism 40, so that they are output as one output component from the ring gear 44. Accordingly, it is possible to reverse the direction of rotation of the ring gear 44 or stop the rotation of the ring gear 44 in accordance with the difference between the speed of the sun gear 41 and the speed of the planetary carrier 42. Therefore, the CVT 10 has an infinite speed-change width. Therefore, using a range in which the fuel consumption of the engine is the best, it is possible for the continuously variable transmission 10 to accelerate to a maximum speed from the starting thereof without using a clutch. In addition, it can cover a very wide range from low speed to high speed in reverse rotation, neutral rotation, and forward rotation without using a forward-backward movement switching device and a switching clutch.

What is claimed is:

1. A continuously variable transmission comprising:
   two pulley-type continuously variable transmission mechanisms, each pressing a belt or a chain from the left and right by clamping sides of the belt or the chain with a corresponding movable sheave of an input-shaft-side pulley, a corresponding fixed sheave of the input-shaftside pulley, a corresponding movable sheave of an output-shaft-side pulley, and a corresponding fixed sheave of the output-shaft-side pulley, and by moving the movable sheave by a corresponding pulley moving device, so that power is transmitted by friction force thereof, the corresponding pulley moving device being provided at a back side of the movable pulley; and a planetary gear mechanism that receives and combines two output components from the two pulley-type continuously variable transmission mechanisms, and that outputs the combined output components as one output component, wherein the two input-shaft-side fixed sheaves are integrally connected and secured to each other while back sides of the two input-shaft-side fixed sheaves abut against each others, wherein one of the output-shaft-side movable sheaves and the other of the output-shaft-side fixed sheaves are provided between one of the output-shaft-side fixed sheaves and the other of the output-shaft-side movable sheaves while the back sides of the one of the output-shaft-side movable sheaves and the other of the output-shaft-side fixed sheaves abut against each other, so as to be rotatable relative to each other and so as to be movable together along an input shaft of a sun gear or along an input shaft of a planetary carrier, the one of the output-shaft-side movable sheaves being consecutively provided with an input shaft of a ring gear or the input shaft of the planetary carrier of the planetary gear mechanism, the other of the output-shaft-side fixed sheaves being provided consecutively with the input shaft of the planetary carrier or the input shaft of the sun gear of the planetary gear mechanism.

2. The continuously variable transmission according to claim 1, further comprising a pressure control hydraulic mechanism that controls a speed change by controlling a hydraulic balance for moving the two input-shaft-side movable sheaves, and that sets tension of the belt or the chain on the basis of a pressure absolute value for moving the two input-shaft-side movable pulleys and the other of the output-shaft-side movable sheaves.

* * * * *